United States Patent [19]

Erb

[11] 3,925,805

[45] Dec. 9, 1975

[54] SYSTEM FOR TRANSFERRING CHARGE BETWEEN SPACED APART CCDS BY DIRECT SERIES CONNECTION

[75] Inventor: Darrell M. Erb, Newport Beach, Calif.

[73] Assignee: Hughes Aircraft Company, Culver City, Calif.

[22] Filed: Jan. 28, 1974

[21] Appl. No.: 437,422

[52] U.S. Cl. ............... 357/24; 307/221 D; 307/304

[51] Int. Cl.² ........................................... H01L 29/78

[58] Field of Search ......................... 357/24; 307/304

[56] References Cited

UNITED STATES PATENTS 3,763,480 10/1973 Weimer ................................ 357/24

OTHER PUBLICATIONS

A. M. Mohsen et al., "Push Clocks: A New Approach to Charge-Coupled Clocking" Appl. Physics Lett. Vol. 22, (2/73) p. 172–175.

R. D. Melen et al., "One-Phase: A New Approach to Charge-Coupled Device Clocking" IEEE J. Solid-State Circuits (2/72) p. 92–93.

M. F. Tompsett et al., "Use of Charge Coupled Devices for Delaying Analog Signals" IEEE J. Solid State Circuits Vol. SC-8 (3/73), pp. 151–157.

W. F. Kosonocky et al., "Charge Coupled Digital Circuits" IEEE J. Solid State Circuits Vol. SC-6 (10/71) pp. 314–322.

*Primary Examiner*—Martin H. Edlow
*Assistant Examiner*—Gene M. Munson
*Attorney, Agent, or Firm*—Joseph E. Szabo; W. H. MacAllister

[57] ABSTRACT

Charge is transferred from the output of one charge coupled device (CCD) to the input of another through a direct connection by means of special DC biased coupling electrodes in each. The effect of the inter-CCD conductors' stray capacitance is minimized by the relatively large dynamic input resistance introduced into the receiving CCD by its coupling electrode.

14 Claims, 9 Drawing Figures

Fig. 2

SYSTEM FOR TRANSFERRING CHARGE BETWEEN SPACED APART CCDS BY DIRECT SERIES CONNECTION

The present invention relates generally to charge coupled devices (CCDs) and, more particularly, to systems containing at least a pair of such devices, wherein charge which has been stepped through a plurality of stages in the first CCD are to be transferred to the second CCD for further processing.

An example of a system in which charges which have been stepped along one CCD need to be transferred into a second CCD for further processing is disclosed in copending application Ser. No. 436,586, filed on even data herewith by Donald J. Holscher, Kjell Nummedal, John Hartman, and Darrell Erb entitled, "Monolithic IR Detector Arrays with Direct Injection Charge Coupled Device Read Out", and assigned to the assignee of the present invention. In the system disclosed in the Holscher et al application whose disclosure is incorporated by this reference, a plurality of CCD shift registers act as delay lines for several groups of sequentially generated signals. All of the time delay CCD shift registers work on the same cycle, and the charges which are sequentially injected into their successive stages arrive at their outputs at the same time. At the end of each cycle the outputs of the respective time delay CCD shift registers are injected into successive stages of an additional multiplexing shift register whose electrodes are clocked to shift through and out all of the injected charges before the next similar injection from the time delay CCDs.

In order to reduce to a minimum the complexity of a signal processing system of the above type, it has been proposed, as explained in the referenced application, to effect a direct coupling between the outputs of the time delay CCDs and the inputs of the multiplexing CCD. The difficulty with this approach is that in a typical layout the various time delay, or "sending", CCDs will of necessity be located so that the distances between their outputs and the inputs of the multiplexing, or "receiving" CCD, to which they are connected, will vary. As a result, the stray capacitance of the conductor used to successive the sending CCDs to the successivve stages of the receiving CCD will also vary, and will introduce different transfer characteristics between the various sending CCDs and the receiving CCD.

It is, therefore, a principal object of the present invention to minimize the size of CCD signal processing systems by directly intercoupling individual CCDs of the system.

It is a further object of the invention to eliminate the problem attendant to directly coupling to a CCD, the outputs of several CCDs which are located at different distances therefrom.

Yet another object of the invention is to provide a system for passing electric charge from one CCD to another through a conductor so that the variations in the stray capacitance of the conductor do not affect significantly the operation of the receiving CCD.

These and other objects of the invention are attained by providing both the sending CCD and the receiving CCD with a DC biased coupling electrode. The sending CCD is provided with means, such as a P-N junction, in the substrate for extracting charges from the substrate immediately underlying one of the conventional electrodes of the CCD defined as the CCD channel; and similarly, the receiving CCD is provided with means, such as a P-N junction, for injecting charges into the CCD channel under one of its conventional electrodes.

The output coupling electrode is situated intermediate the output junction and the conventional electrode next to which it is located; and similarly, the input coupling electrode is situated between the input junction and the electrode next to it. By maintaining the coupling electrodes at predetermined, but different potentials, the output and input regions may be directly interconnected without incurring any detrimental results due to the stray capacitance of the direct connection.

The reason underlying the success of the present invention is that the input coupling electrode of the receiving CCD introduces a sufficiently large dynamic input resistance into that device to minimize the effect of the impedance which results from the stray capacitance of the direct connection. As a result, direct connections can be achieved between widely separated sending CCDs and a receiving CCD which is remote from all of them.

LIST OF FIGURES

FIGS. 3*a–d* are a series of diagrams illustrating the progress of charge packets as they are transferred from the sending CCD to the receiving CCD;

FIGS. 4*a–d* are a series of waveforms illustrating the voltage through which the electrodes of the sending CCD and the receiving CCD are stepped during times *t*1 through *t*4 to effect the transfer of charge illustrated in FIGS. 3*a*–3*d;*

Figure 2:
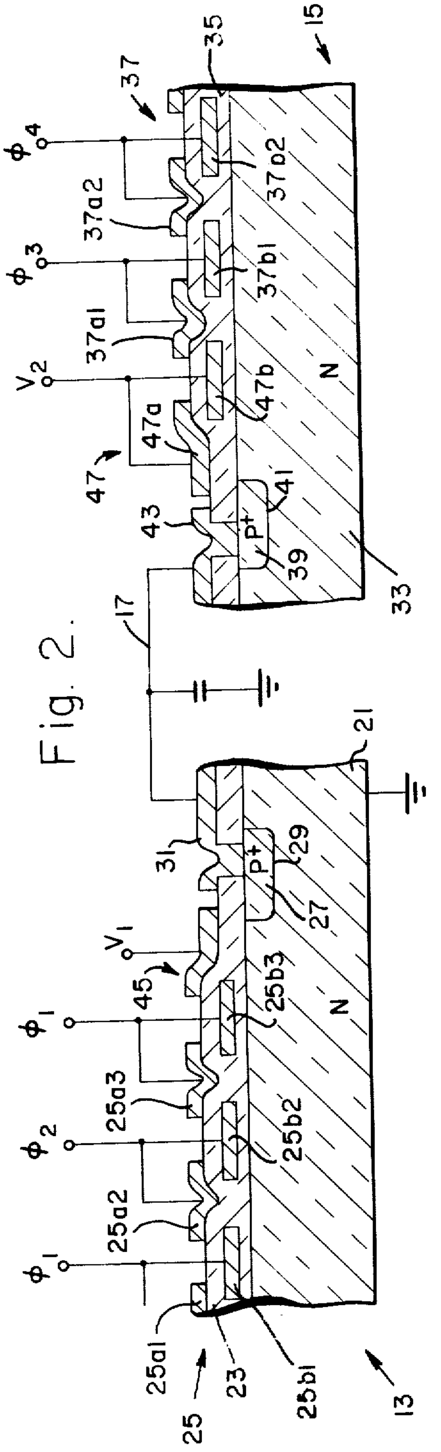
FIG. 2 illustrates in cross-section, the output end of one of the sending CCDs and the input end of the receiving CCD shown in block form in FIG. 1 to illustrate the principle of the invention.

FIGS. 5*a–d* are an alternative series of waveforms which may be applied to the electrodes of the CCDs to effect charge transfer;

FIGS. 6*a–d* are a series of diagrams, similar to FIGS. 3*a–d*, to illustrate the progress of charge packets in the system of FIG. 2 in response to the waveforms of FIGS. 5*a–d;*

Figure 7:
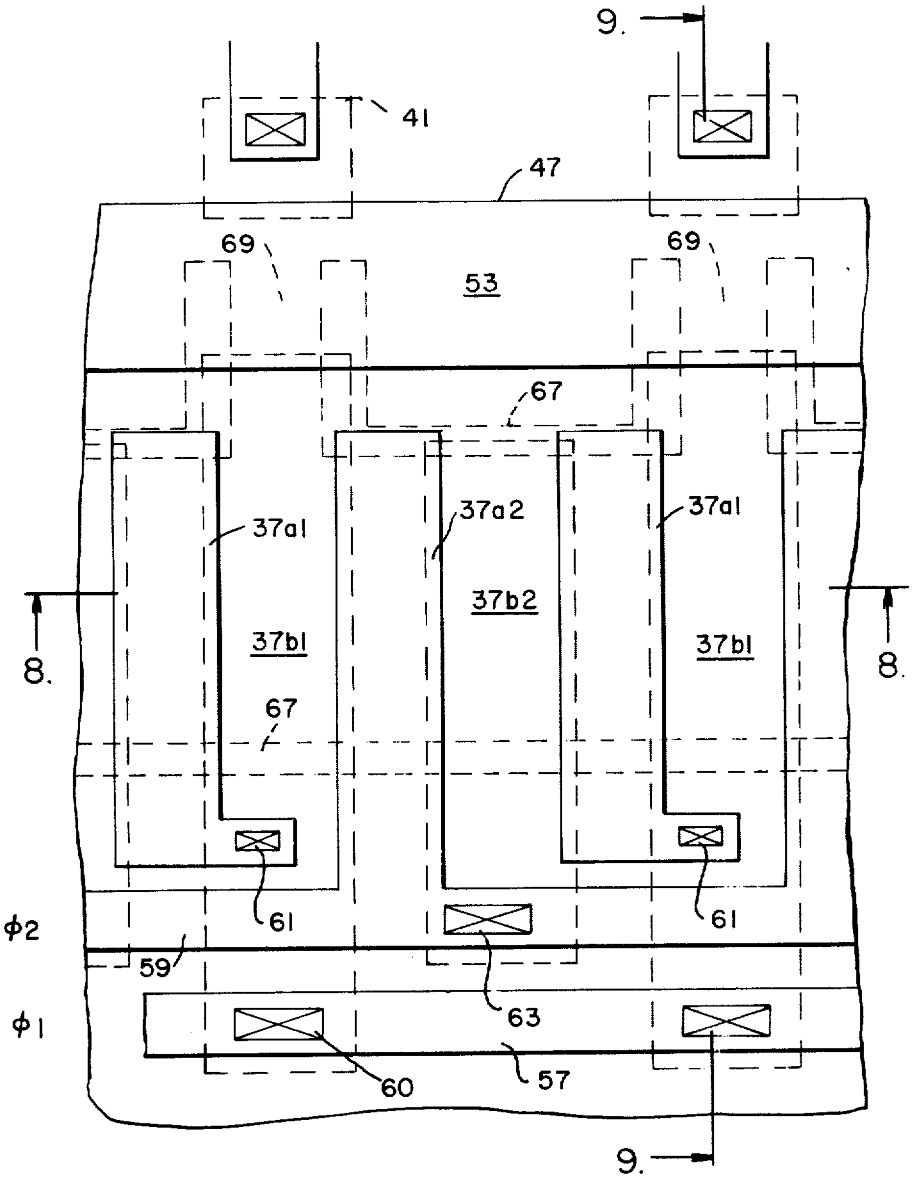
Figure 9:
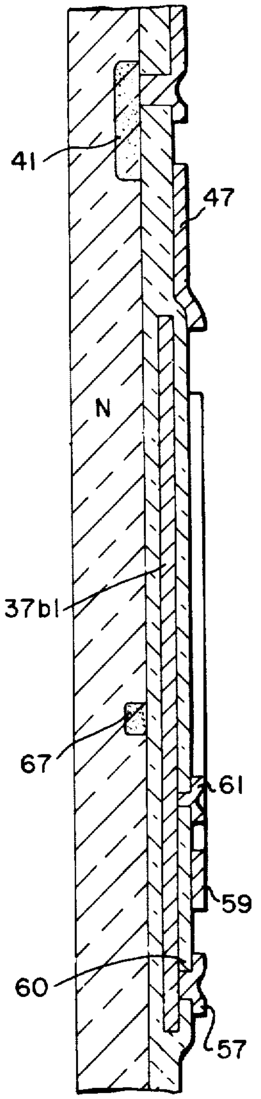
Figure 8:
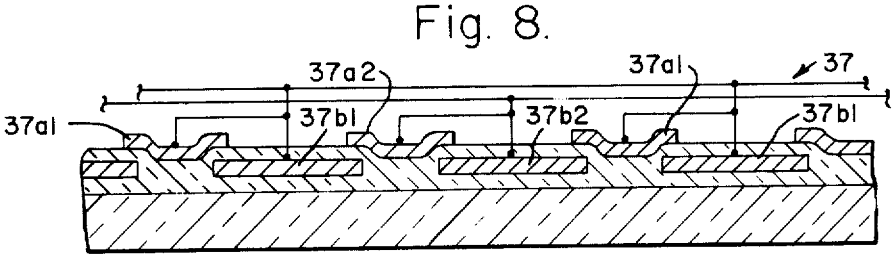

FIG. 7 is a partial plan view of the exemplary receiving CCD illustrated partially in FIG. 2, illustrating two of its stages and the manner in which signals may be injected into them;

FIG. 8 is a section through FIG. 7 along lines 8–8 illustrating the relative locations of the conventional electrodes and the coupling electrode of the device;

FIG. 9 is a section through FIG. 7 along lines 9–9 showing the disposition of the conventional electrodes of the device.

Figure 1:
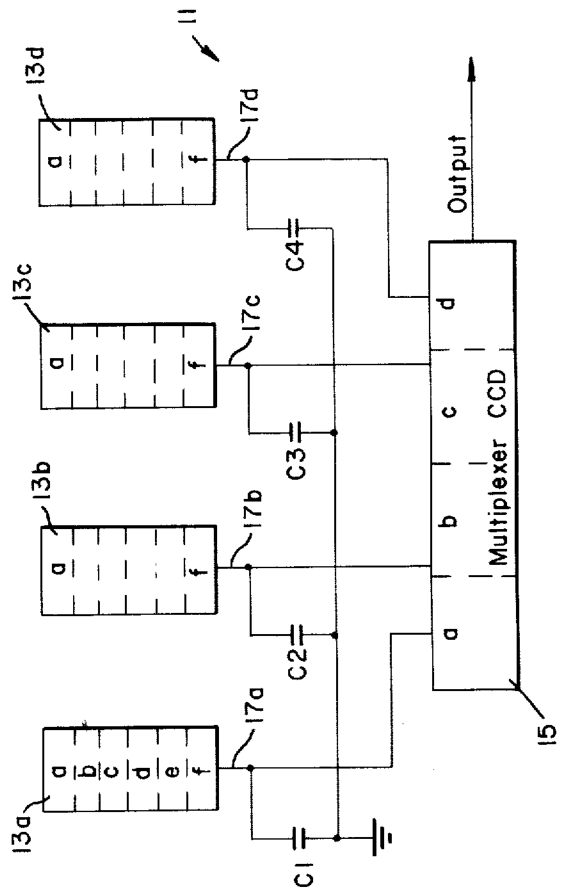
FIG. 1 is a block diagram of a system wherein the outputs of a plurality of CCD shift registers are applied to successive stages of a single multiplexing CCD shift register.

Turning now to the Figures, an exemplary system illustrating an application of the present invention is shown in FIG. 1. It includes four time delay or sending CCDs 13A, 13B, 13C, and 13D, each shown as having a set of six stages *a–f,* through which charge packets injected into the CCDs are stepped. Such charges are read out of the sending CCD 13 and applied to successive inputs A–D of a multiplexing or receiving CCD 15 over lines 17A–17D respectively. The detailed manner in which charges are stepped along the sending and receiving CCDs 13 and 15 need not be discussed in detail, these being disclosed in the above-referenced copending Holscher et al. application. For purposes of understanding the present invention it is sufficient to note that the centrally located sending CCDs 13B and 13C are nearer the receiving CCD 15 than the extreme sending CCDs 13A and 13D. Consequently, the connecting lines 17A–17D are of unequal length and their stray capacitances C1–C4 will be unequal. To overcome this problem it would be necessary either to introduce artificial length into the shorter lines 17B and 17C or to use coupling amplifiers in all of the lines in order to equalize their transmission characteristics.

The manner in which the system of FIG. 1 is permitted to operate without the need for any of the above expedients is illustrated in FIG. 2 wherein there is shown on the left, the output end of one of the sending CCDs 13 and on the right, the input end of the receiving CCD 15. They are both illustrated to be of the type having two sets of electrodes disposed on an N-type substrate, with charges being stepped along the surfaces of the substrate immediately underneath the electrodes by means of a two-phase clock. It will be understood that the present invention may be utilized with buried channel CCds in which charge is propagated slightly below the substrate surface. It will also be understood by those skilled in the art that equivalent CCDs may be produced in a P-type substrate and that electrodes may be arranged in three sets or more, and may be actuated by three or more phases of clocking pulses. In the particular embodiment shown in FIG. 2, the sending CCD 13 is formed by disposing a series of electrodes 25, partly buried in and partly along the surface of a dielectric layer 23 formed on the surface of an N-type substrate 21. Each electrode 25 comprises a transfer electrode portion 25*a*, usually aluminum, on the surface of the dielectric layer, and a storage electrode portion 25*b*, typically polycrystalline silicon, buried in the dielectric layer. This type of electrode construction for CCDs is well known. For its theory of operation, reference may be made to the New Concept for Memory and Imaging: Charge coupling; *Electronics*, June 21, 1971, pp 50–59.

Disposed adjacent to the last of the CCD electrodes 25 is an output P+ diffusion 27 creating an output PN junction 29 with the substrate 21. Charges are withdrawn through the junction 29 and the diffusion through an output contact 31 which extends to the diffusion through an opening in the oxide 23.

In a similar manner, the exemplary receiving CCD 15 illustrated in FIG. 2 comprises a set of CCD electrodes 37, each comprising a surface electrode portion 37*a* and a buried electrode portion 37*a* lying within and on top of a dielectric layer 35 disposed on an N-type substrate 33. An input P+ diffusion 39 formed adjacent the first CCD electrode 37 creates a P–N junction 41, with a metal contact 43 extending through the dielectric layer 35 making contact to the diffusion 39 to inject charges into the receiving CCD 15. The input contact 43 of the receiving CCD is connected by a direct conductor 17 to the output conductor 31 of the sending CCD 13.

In accordance with the present invention an output coupling electrode 45 is provided between the last electrode 25 of the sending CCD 13 and its output diffusion 27. Similarly, an input coupling electrode 47 is provided intermediate the input junction 39 of the receiving CCD 15 and its nearest electrode 37. In both cases, it is preferable that the coupling electrode overlap the CCD electrode and the diffusion between which it is located. In the case of the sending CCD 13 the coupling electrode 45 is shown as a single metal member disposed on the surface of the dielectric layer 23 in the same manner in which the conventional surface electrode portions 25*a* are disposed. In contrast, the input coupling electrode 47 on the receiving CCD 13 is shown to comprise two portions, a surface portion 47*a* and a buried portion 47*b*, whose functions are analogous to the surface and buried portions 37*a* and 37*b* of the CCD electrode 37. In other words, the function of the surface portion 47*a* of the input coupling electrode 47 is to shift charge from the input diffusion 39 toward subsequent electrode portions. In contrast, the function of the buried portion 47*b* of the input coupling electrode 47 is to create a relatively deep potential well in which charge may temporarily be stored.

It is an important aspect of the present invention that the coupling electrodes 45 and 47 are biased with predetermined potentials relative to the substrates 21 and 33 of the sending and receiving CCDs 13 and 15. These potentials are such that the sending and receiving junctions 29 and 41 are reverse biased. In the case of an N-type substrate and a P+-type diffusion, the potentials V1 and V2 at which the electrodes 45 and 47 are maintained are negative. The principal function of the biasing potentials V1 and V2 is to insure the proper flow of charge from the sending CCD 13 to the receiving CCD 15. Such flow will occur so long as V2 does not exceed (e.g. is not more positive than) V1 where the charge flow comprises holes, which is the case with an N-type substrate. The reverse would apply if a P-type substrate having electrons as the charge carriers were used. Since the flatband voltages of the CCD elements 45 and 47*a* may differ, it is preferable that the absolute value of V2 be greater than that of V1 relative to the substrate potential by at least the amount of this difference to insure proper charge flow toward the receiving CCD.

Figure 3:
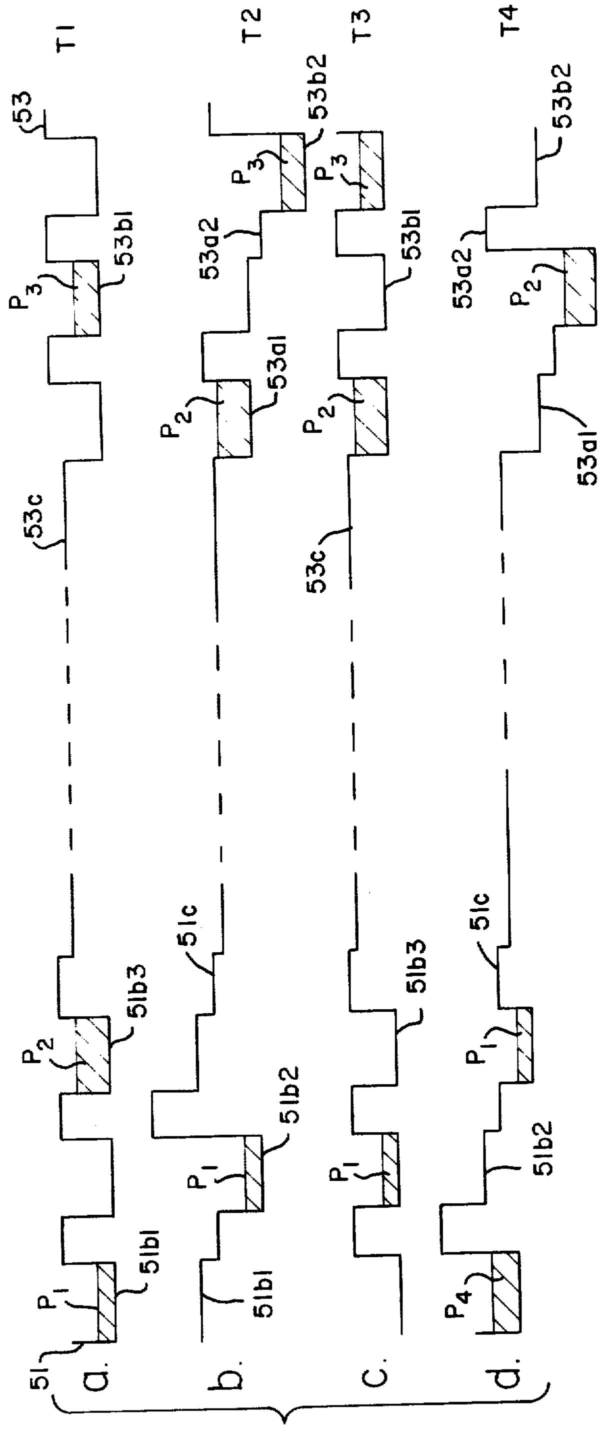
Figure 4:
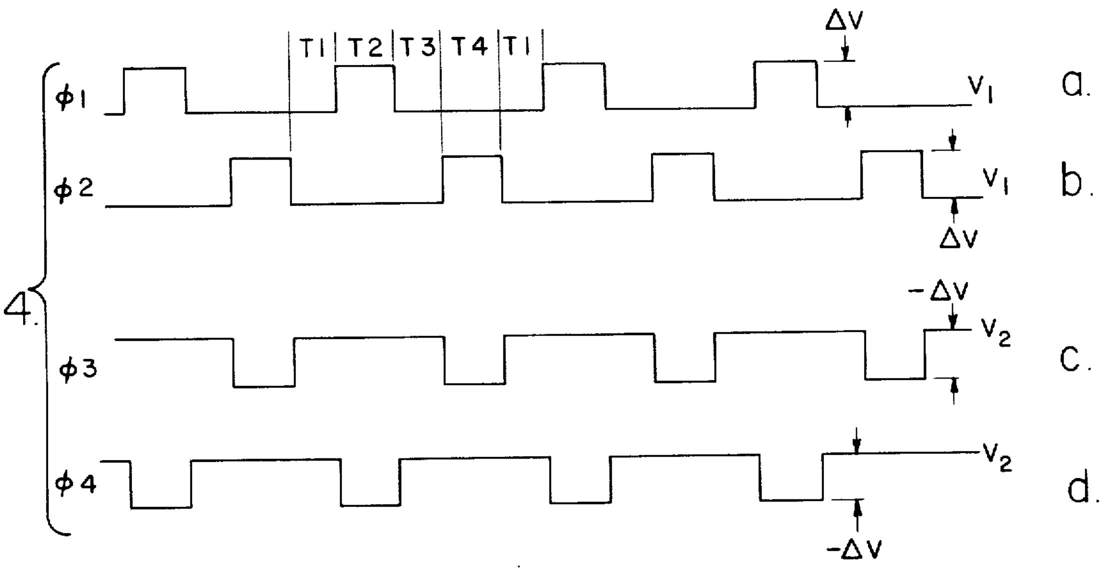
Figure 5:
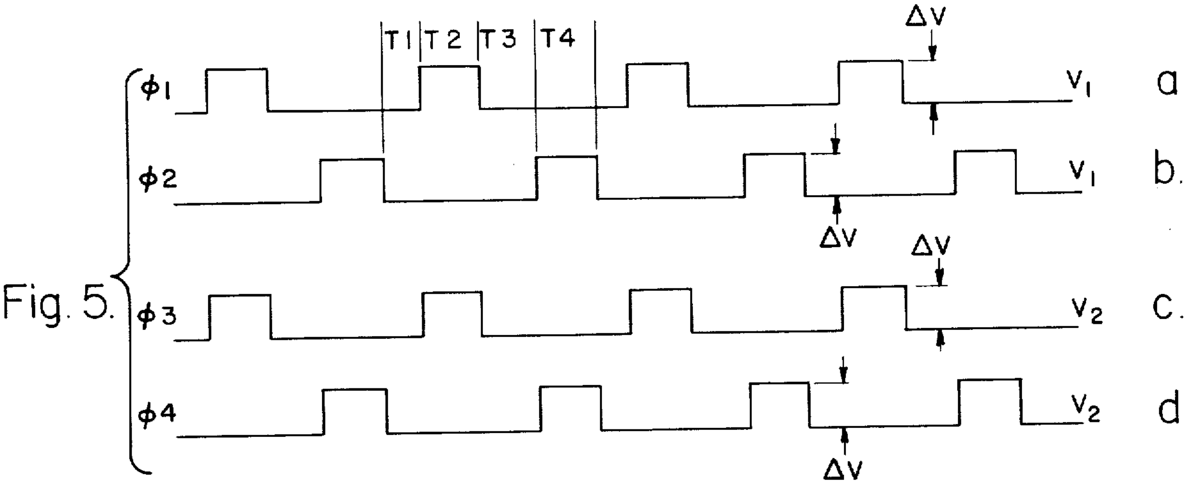

The manner in which signals are processed in the sending and receiving CCDs 13 and 15 and sent from the first to the second may be best understood by referring to FIGS. 3 and 4. In FIG. 4 are shown a set of clock voltage $\phi$1, $\phi$2, $\phi$3, and $\phi$4, whereby the correspondingly labeled CCD electrodes in FIG. 2 may be energized. An alternative set of such voltages is shown in FIG. 5 and will be discussed hereinafter.

Reference to FIG. 4 reveals that the clock voltages $\phi$1 and $\phi$2, which are applied to alternate ones of the electrodes 25 of the sending CCD 21, have the same frequency and pulse height but are interlaced symmetrically, with each having a base potenial (relative to the substrates) equal to U1 and a positive excursion therefrom of $\Delta V$. The clock voltages $\phi$3 and $\phi$4 which are applied to the electrodes 37 of the receiving CCD 15 have the same frequency as $\phi$1 and $\phi$2, and have a base potential equal to V2 and an excursion therefrom of $-\Delta V$. $\phi$3 and $\phi$4 are 180° out of phase as are $\phi$1 and $\phi$2.

Referring now to FIGS. 3*a*–3*d*, the operation of the system illustrated in FIG. 2 may be understood by following the progress of selected charge packets through the sending and receiving CCDs at four successive time periods T1, T2, T3, and T4. What is shown at the four successive times T1-T4 in solid lines 51 on the left of each of FIGS. 3*a*–3*d* is the channel potential along the substrate-dielectric interface of the sending CCD 13. A corresponding solid line 53 on the right-hand side of each of the four FIGS. 3*a*–3*d* shows the channel potential at the substrate-dielectric interface of the receiving CCD 15. The same solid lines 51 and 53 also represent the depths or contours of the depletion regions in the CCD substrates. A depletion region is created when a potential is applied to an electrode on the surface of the substrate of a polarity which will tend to repel majority carriers which in the case of an N-type substrate are electrons. The higher the channel potential, the deeper the depletion region. Potential wells for temporarily storing minority carriers are created by especially deep portions in the depletion region. As these potential wells are shifted along the CCD, charges stored in them are similarly carried along.

Referring first to FIG. 3*a*, application of the $\phi 1$ clock voltage to the $\phi 1$ electrodes 25 creates the depletion region contour whereby potential wells **51*b*1 and 51*b*3 are created under the storage portions 25*b*1 and 25*b*3 of those electrodes. This is due to the $\phi 1$ waveform being at its most negative level V1. During this same time period T1, the other clock waveform $\phi 2$ is also at its most negative level and consequently a potential well 51*b*2 exists under the second electrode storage portion 25*b*2** as well.

To the immediate left of each potential well **51*b*1, 51*b*2, and 51*b*3, the depletion region is significantly shallower because of the greater distance of the surface electrode portions 25*a* from the substrate 21**.

Potential wells **53*b*, 53*b*1, and 53*b*2 exist also in the receiving CCD 15 under its storage electrodes 37*b*, 37*b*1, and 37*b*2. It will be noted that the first potential well 53*b* is that which is created by the storage electrode portion 47*b* of the input coupling electrode 47. Let it be assumed that three charge packets P1, P2, and P3 are contained during time period T1 in the illustrated portions of the two CCDs 13 and 15. Each is shown to have a different magnitude since the information content of the signal processed through a CCD is represented by the magnitude of a charge packet which is passed through its potential wells. During the next time period T2, the waveform $\phi 1$ rises by an amount $\alpha$V, and the waveform $\phi 4$ drops by an amount $-\Delta$V. As a result, the potential well 51*b*1 under the first storage electrode 25*b*1 shown is raised, causing the charge packet P1 which had been in it, to be dumped into the next potential well 51*b*2 whose level remains unchanged. Similarly, the potential well 51*b*3 under the last electrode storage portion 25*b*3 is raised to a level which is above the depletion region under the output coupling electrode 45, causing the charge packet P2 to be transferred along the line 17 to the potential well 53*b* under the storage portion 47*b* of the input coupling electrode 47 of CCD 15. Finally, the charge packet P3 which had been under the storage portion of the first electrode 37 in the receiving CCD 15 is shifted to the next potential well 53*b*2** to the right due to the drop in the level of the potential well by the change in the state of the $\phi 4$ clock.

During the next time period T3, all four of the clocking voltages $\phi 1$–$\phi 4$ return to their normal levels and the potential wells are returned to the state which they had during the time period T1. The net change, therefore, from time period T1 is that each of the charge packets has moved one position to the right and, significantly, the charge packet P2, which had been under the last electrode 25 of the sending CCD 13 is now in the potential well **53*b* provided by the input coupling electrode 47 of the receiving CCD 15**.

During the final time period T4 under consideration, the clock voltages $\phi 2$ and $\phi 3$, respectively, rise and drop by an amount $\Delta$V and $-\Delta$V. As a result, the potential well **51*b*2 containing the charge packet P1 is raised, dumping the charge packet P1 into the potential well 51*b*3 under the last electrode 25. Similarly, the potential well under the first electrode 37 of the receiving CCD 15 is dropped, causing the charge packet P2 to be transferred from under the input coupling electrode 47 to under the first electrode 37 and, in particular, into the potential well maintained under its storage portion 37*b*1. Additionally, another charge packet P4 is dumped into the potential well 51*b*1 under the storage electrode 25*b*1 of the sending CCD 13. During the next time period T5, all of the clocking voltages $\phi 1$–$\phi 4$ again return to their normal levels V1 and V2, thus, placing the sending and receiving CCDs 13 and 15 in the same condition in which they were illustrated for the time period T1, ready to send a charge packet across the line 17**.

Figure 6:
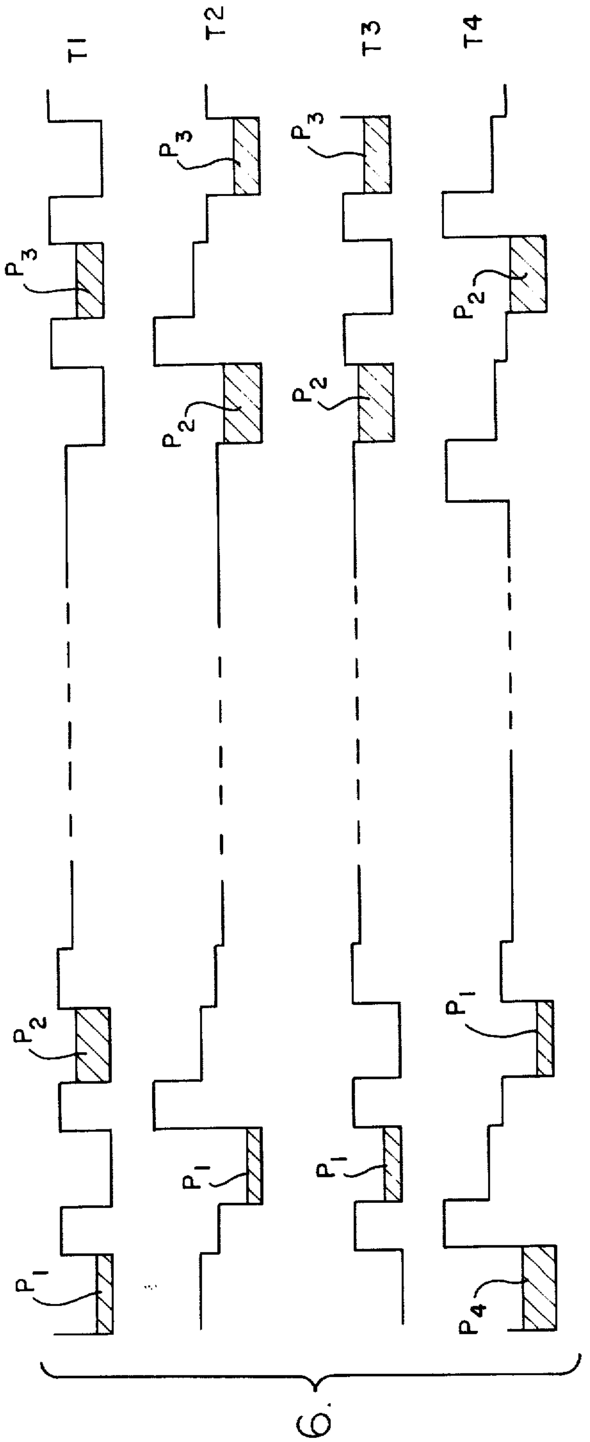

An alternative set of clock voltages for energizing the electrodes of the sending and receiving CCDs 13 and 15 is illustrated in FIG. 5, and the resulting potential wells are illustrated in FIG. 6. They differ from the arrangement shown in FIGS. 3, and 4 only in that the $\phi 3$ and $\phi 4$ clock voltages are respectively in phase with the $\phi 1$ and $\phi 2$ clock voltages and in that the input coupling electrode 47 is biased with the $\phi 4$ potential rather than with V2. An analysis similar to that given with reference to FIG. 3 will show that the clocking and biasing potentials shown in FIG. 5 will result in the transfer of charge along and between the CCDs 13 and 15 in a manner similar to that achieved by the clocking arrangement of FIG. 3, provided that the $\phi 4$ voltage being applied to the input coupling electrode 47 is no greater than that being applied to the output coupling electrode 45 during time period T2 when charge is transferred from CCD 13 to CCD 15. Again, it is preferable that V2 be more negative than V1 in order to provide for variations in the flatband voltages of the CCD elements 45 and **47*a***.

Referring, more particularly, to FIGS. 5 and 6, it will be noted that the clock voltages being applied to the $\phi 1$ and $\phi 2$ terminals of the sending CCD 13 are the same as previously. Similarly, the potential wells and the progress of charge packets P1 and P2 through them is the same as discussed with reference to FIG. 3. During the time period T1, all of the voltages $\phi 1$, $\phi 2$, $\phi 3$, and $\phi 4$ are the same as they were during the same time with the clock voltages illustrated in FIG. 4. Consequently, the status of the potential wells under the electrodes in the receiving CCD 15 is the same as during the same time period illustrated in FIG. 3. There is, however, a departure from the situation depicted previously for the time period T2. The charge packet P3 is transferred from under the electrode **37*b*1 to under the electrode 37*b*2, not by a drop in the level of the potential well under tha latter electrode as was the case previously, but by raising the level of the potential well inn the first electrode 37*b*1**. In other words, the charge is "pushed" by raising the level of the potential well in which it resides rather than being "dropped" by lowering the level of the potential well into which it is to be transferred. For this reason the type of clocking illustrated in FIG. 3 is sometimes called a "drop clock" scheme, whereas that illustrated in FIG. 5 is referred to as a "push clock" scheme.

At time T3, the push clock situation shown in FIG. 6 returns to that which existed with the drop clock scheme illustrated in FIG. 3 because the potentials are again the same with both clocking schemes. During time period T4, there is again observed the salient difference between the two clocking schemes, namely, that the charges T1 and T2 are shifted one position to the right by dropping the level of the potential well to the right of that in which they had resided during the time period T3. The most important thing to note is that which is common between the clocking schemes illustrated in FIGS. 3 and 6: The potential gradient which is established during the time period T2 from the substrate under the last storage electrode 25*b*3 of the sending CCD, through the substrate under the output coupling electrode 45 of that CCD, to the substrate under the storage electrode 47*b* of the receiving CCD 15. It will be recalled that, with the drop clock scheme of FIG. 3 there was established a descending stairstep potential gradient from the substrate under the storage electrode 25*b*3 through the substrate under the output coupling electrode 45 to the substrate under the input coupling electrode 47 of the receiving CCD 15. The same key relationship exists also during the time period T2 with the push clock scheme of FIG. 6. Thus, it is seen that, so long as the progressively descending (more negative) voltage illustrated in FIG. 3*b* is present during the time period when charge is to be transferred between CCDs, it does not matter if at certain other times this relationship does not exist as is the case, for example, during time period T4 with the push clock scheme as shown in FIG. 6*d*.

The progressively descending voltage of FIG. 3*b* is appropriate for the N-type substrates used herein for purposes of illustration. If P-type substrates were used instead, a progressively ascending (more positive) voltage would be required. Thus, the generic idea is for the absolute value of the voltage to increase relative to the potential of the substrate in going from the sending to the receiving CCD.

In FIG. 2, the receiving CCD 15 is illustrated cross-section, showing injection of charges at a single junction 41 and the stepping of those charges along a succession of electrodes 37. Illustrated in FIG. 7 in plan view is an exemplary multistage receiving CCD 15. It reveals a layout which may be used where injection into successive stages 53 of a CCD shift register is desired. Each stage comprises two electrodes 37, made up of a surface electrode 37*a* and a buried electrode 37*b* as explained previously with reference to FIG. 2. The $\phi1$ clock voltage is supplied over a bus line 57 directly to the first buried electrode 37*b*1 through a contact 60. The clocking voltage $\phi1$ is also supplied to the first surface electrode 37*a*1 through a contact 61.

The $\phi2$ clocking voltage is supplied over a second bus line 59 from which it is applied to the second surface electrode 37*a*2, with which it is integral, and to the second buried electrode 37*b*2 through contact 63.

Charges to be shifted along the CCD 15 are maintained in a channel by means of a channel stopper 67 formed by creating an N+ diffusion in the substrate. Inlets 69 are provided into the charge channel through the channel stopper 67 to permit injection of charges into successive stages. The plan view of the CCD 15 reveals that charges are injected through each injecting junction 41 along the side of the device into the "stream" of charges which are being stepped toward the right along its electrodes 37. It is also seen that the input coupling electrode 47, shown in the particular embodiment of FIGS. 7–9 as comprising only a single surface electrode, extends as a unitary member between the successive injecting junctions 41 and the CCD electrodes 37 so that the input coupling electrodes of all CCD stages are formed on an integral conducting member. They might also comprise a pair of such members as would be the case in the exemplary embodiment illustrated in FIG. 2.

In the particular layout illustrated in FIGS. 7–9, the buried electrode portion 37*b*1 of the first electrode 37 in each stage 53 serves both to store charge coming from the injecting junction 41 and to store charge arriving from the preceding stage of the CCD. This is why the electrode portion 37*b*1 extends into the inlet 69.

Although the present invention has been illustrated by means of a multistage receiving CCD, it will be appreciated that it would also be applicable where the receiving CCD has only a single input junction. Other modifications will occur to those skilled in the art. Thus, for example, the input coupling electrode 47 need not be configured in the manner shown. Its two members 47*a* and 47*b* could both be in the form of a surface electrode which would be closely spaced, with the second portion 47*b* having imposed upon it a larger biasing potential in order to create thereunder the potential well which in the illustrated embodiment is the result of the relatively close spacing of the electrode 47*b* to the substrate. Similarly, different configurations could be provided for the CCD electrode 37 as mentioned previously.

What is claimed is:

1. A system for coupling charge from a sending CCD to a receiving CCD, each CCD having distributed along the surface of a semiconducting substrate an array of charge handling electrodes, said system comprising:

a. means for cyclically stepping the electrodes of said sending CCD through a plurality of potentials so as to intermittently induce potential wells under them;
b. means for cyclically stepping the electrodes of said receiving CCD through a plurality of potentials so as to intermittently induce potential wells under them;
c. a doped region forming an output P-N junction in the substrate of said sending CCD adjacent one of its electrodes;
d. a doped region forming an input P-N junction in the substrate of said receiving CCD adjacent one of its electrodes;
e. an output coupling electrode in said sending CCD intermediate said one of its electrodes and said doped region adjacent thereto;
f. an input coupling electrode in said receiving CCD between said one of its electrodes and said doped region adjacent thereto;
g. means for directly interconnecting said doped regions; and
h. means for maintaining respective ones of said output coupling electrode and said input coupling electrode at first and second preselected potentials relative to said substrates.

2. The system of claim 1 characterized further in that at least one of said coupling electrodes overlaps both the electrode and the doped region between which it is located.

3. The system of claim 1 characterized further in that said second preselected potential differs from said first preselected potential to the extent necessary to cause charge flow from said sending CCD through its output junction to said receiving CCD through its input junction.

4. The system of claim 3 characterized further in that both of said preselected potentials are constant.

5. The system of claim 3 characterized further in that said first preselected potential is constant, and said second preselected potential alternates between a plurality of voltage levels.

6. The system of claim 5 characterized further in that the voltage levels between which said second preselected potential alternates are all greater relative to said substrates than said first preselected potential.

7. The system of claim 1 characterized further in that said output coupling and input coupling electrodes are maintained at constant potentials V1 and V2, respectively, with the absolute value of V2 being greater relative to said substrate than the absolute value of V1.

8. The system of claim 7 characterized further in that the electrodes of said sending CCD are stepped between a pair of potentials V1 and V1 + ΔU and the electrodes of said receiving CCD are stepped between a pair of potentials V2 and V2 − ΔV, where ΔV is a voltage excursion selected to bring about charge transfer within said CCDs.

9. A system for directly transferring the outputs of a plurality of sending CCDs to successive stages of a single receiving CCD, each said CCD having distributed along the surface of a semiconducting substrate an array of charge handling electrodes, said system commprising in combination:

a. means for stepping the electrodes of said sending CCDs in cyclic succession through a plurality of potentials;
b. means for clocking the electrodes of said receiving CCD in cyclic succession through a plurality of potentials;
c. output means in the substrate of each sending CCD adjacent of its electodes for extracting charge from said last of its electrodes;
d. input means in said receiving CCD adjacent successive ones of its electrodes for injecting charge into the substrate under said electrodes;
e. an output coupling electrode in each sending CCD between said one of its electrodes and its output means;
f. an input coupling electrode in said receiving CCD between respective ones of its input means and the electrodes adjacent thereto;
g. means for directly and individually connecting the output of respective ones of said sending CCDs to respective input coupling electrodes of said receiving CCD; and
h. means for maintaining said output coupling electrodes at a first pre-selected potential and said input coupling electrode at a second pre-selected potential relative to said substrates.

10. The system of claim 9 characterized further in that said output means and said input means are doped regions forming output and input junctions in said substrates, and in that said coupling electrodes overlap both the electrode and the doped region between which they are located.

11. The system of claim 10 characterized further in that said second potential differs from said first potential to the extent necessary to cause charge flow from said sending CCDs through their output junctions to said receiving CCD through its input junction.

12. The system of claim 9 characterized further in that said output coupling and input coupling electrodes are maintained at potentials V1 and V2, respectively, with the absolute value of V2 being greater relative to said substrate than the absolute value of V1.

13. The system of claim 9 characterized further in that the electrodes of said sending CCDs are stepped between a pair of potentials V1 and V1 + ΔV and the electrodes of said receiving CCD are stepped between a pair of potentials V2 and V2 − ΔV, where ΔV is a voltage excursion selected to bring about charge transfer within said CCDs.

14. A system for coupling charge from a sending CCD to a receiving CCD, each CCD having distributed along the surface of a semiconducting substrate in an array of charge handling electrodes, said system comprising:

a. means for stepping the electrodes of said sending CCD in cyclic succession through a plurality of potentials;
b. means for stepping the electrodes of said receiving CCD through a plurality of potentials;
c. means forming an output P-N junction in the substrate of said sending CCD adjacent one of its electrodes;
d. means forming an input P-N junction in the substrate of said receiving CCD adjacent one of its electrodes;
e. an output coupling electrode in said sending CCD intermediate said one of its electrodes and said junction adjacent thereto;
f. an input coupling electrode in said receiving CCD between said one of its electrodes and said junction adjacent thereto;
g. means for directly interconnecting said junction forming means; and
h. means for maintaining said output coupling electrode and said input coupling electrode at preselected potentials so as to create a stairstep channel potential gradient from the substrate under said one electrode of said sending CCD through the substrate under said output coupling electrode of said sending CCD, to the substrate under said input coupling electrode of said receiving CCD, said potential gradient being characterized by the fact that the absolute value of said channel potential relative to the potential of said substrates progressively increases from the sending CCD toward the receiving CCD.

* * * * *

UNITED STATES PATENT AND TRADEMARK OFFICE

CERTIFICATE OF CORRECTION

PATENT NO. : 3,925,805

DATED : December 9, 1975

INVENTOR(S) : Darrell M. Erb

It is certified that error appears in the above-identified patent and that said Letters Patent are hereby corrected as shown below:

Column 9, line 18 (Claim 8); change " U" to -- V--.

Column 9, line 27 (Claim 9); change "comm-" to --com---;

line 36 (Claim 9); after "adjacent" insert --one--;

Signed and Sealed this

*Thirteenth* Day of *September 1977*

[SEAL]

*Attest:*

RUTH C. MASON
*Attesting Officer*

LUTRELLE F. PARKER
*Acting Commissioner of Patents and Trademarks*